United States Patent [19]

Reynolds et al.

[11] 4,445,221
[45] Apr. 24, 1984

[54] METHOD AND APPARATUS FOR MEASURING THE FREQUENCY RESPONSE OF AN ELEMENT OR ELEMENTS IN A DIGITAL TRANSMISSION PATH

[76] Inventors: Alastair S. Reynolds, 3 West View, Linlighrow Bridge, West Lothian; Ivan R. Young, 45 Maitland Rd., Kirkliston, West Lothian, both of Scotland

[21] Appl. No.: 336,975

[22] Filed: Jan. 4, 1982

[51] Int. Cl.³ .......................................... H04B 17/00
[52] U.S. Cl. ...................................... 375/10; 364/486; 364/580; 371/22
[58] Field of Search ........... 179/175, 175.11, 175.2 R, 179/175.2 D, 175.3 R; 370/13, 17; 371/15, 22; 375/10; 364/481, 484, 486, 550, 579, 580; 455/67

[56] References Cited

U.S. PATENT DOCUMENTS

| | | | |
|---|---|---|---|
| 2,987,586 | 6/1961 | Berger | 179/175.3 |
| 3,544,736 | 12/1970 | Bruwer, Jr. | 179/175.3 |
| 3,922,534 | 11/1975 | Gerstenmeier et al. | 364/486 |
| 3,943,305 | 3/1976 | Hagedorn | 371/22 |
| 4,176,317 | 11/1979 | Manfreda | 371/22 |
| 4,340,788 | 7/1982 | Sbuelz | 370/17 |

Primary Examiner—Benedict V. Safourek
Attorney, Agent, or Firm—Donald N. Timbie

[57] ABSTRACT

The invention is primarily concerned with measuring the frequency response of a regenerator in a digital transmission system. The method and apparatus provide for a variable pulse to be inserted in a sequence of pulses representative of normal traffic through the system and superimposition of a sinusoidal signal on the variable pulse. Results can be plotted from passing a number of sequences through the regenerator and varying the amplitude and/or frequency of the sinusoidal signal and varying the pulse.

31 Claims, 22 Drawing Figures

(a) TEST PATTERN WITH VARIABLE PULSE
(b) AS (a) BUT AT REGENERATOR DECISION POINT
(c) ADDED SINE WAVE $f_s < f_c$
(d) COMBINED OUTPUT WAVEFORM
(e) EFFECT AT DECISION POINT WHEN ERROR BEING PRODUCED
(f)→(h) AS FOR (c)→(e) FOR $f_s > f_c$ WHEN NETWORK LOSS IS GREATER

Fig.5.

MAXIMUM ERROR = $20 \log_{10} (\cos 2\pi/(2M))$ dB $(M > 1)$ (a) STATIC PHASE RELATIONSHIP FOR $f_s = K \frac{f_c}{N}$ (b) AS FOR (a) BUT $f_s = (K + \frac{1}{2}) \frac{f_c}{N}$

IN BOTH (a) AND (b) THOUGH THE TEST PULSE HAS A LOW NOISE MARGIN OTHER PULSES WILL BE RECEIVED IN ERROR FIRST (c) CALCULATION OF MAXIMUM ERROR FROM GRAPH OF SINE WAVE MAXIMUM AMPLITUDE VERSUS PHASE AT DECISION POINT

Fig. 7.

(a) TRANSMITTED ALL ONES SIGNAL WITH TEST PULSE

(b) SIGNAL AT DECISION POINT IN REGENERATOR (c) SPECTRUM OF ALL ONES SIGNAL IN (a)

(d) SPECTRUM AT DECISION POINT I.E. (b)

Fig.10. CABLE PLUS EQUALIZER FREQUENCY RESPONSE OF 2Mb/s LINE REGENERATOR

METHOD AND APPARATUS FOR MEASURING THE FREQUENCY RESPONSE OF AN ELEMENT OR ELEMENTS IN A DIGITAL TRANSMISSION PATH

BACKGROUND

This invention is concerned with improvements in or relating to method and apparatus for measuring the frequency response of an element or elements in a digital transmission path. The term "element" where used herein means, for example, an equalizer, a filter, a cable simulator or any combination thereof including, as appropriate, amplifier circuits associated therewith, as is known to those skilled in the art.

In digital transmission systems, receivers and generators frequently include components whose characteristics are varied by a control loop or automatic gain control (AGC) in order to provide automatically compensation for different lengths of cable along a transmission path of the system. This arrangement makes it impossible to measure frequency response of, for example, the equalizer of a regenerator in the normal manner which would be by disconnecting the normal traffic signal and using a network analyzer.

In some cases where the design permits, it may be possible to freeze the control voltage while a signal is applied. The signal can then be removed and a network analyzer connected, but this method still requires access to internal circuit nodes or connectors.

In the particular case of the British Post Office's 2mb/s digital line system, the regenerators incorporate automatic equalization which compensates for different cable lengths between regenerators. The design is such that the overall frequency response of the cable plus the equalizer is flat up to almost half the bit rate. Above this level, the response is rolled off to optimize the signal-to-noise ratio (S/N) at the decision point of the regenerator. What is of interest is to predict that bit error rate in terms of the S/N ratio at the regenerator input, which requires knowledge of the equalizer's relative frequency response. Because the spectra of the noise differ from that of the signal, their powers are affected differently by the equalizer. This changes the S/N ratio.

Equalizers are usually contained within a "black box" so that access is available only to its input but not to its output which is directly electrically connected to flip-flops, schmitt triggers or the like whose output is unsuitable for monitoring. As mentioned above, the general solution has been to break the circuit at the equalizer output or to use a higher impedance robe at this point. Whichever method is adopted, access must be gained to the equalizer and hooking up of the equalizer circuit modifies the circuit itself so that a true picture of its frequency response cannot be obtained. This, if a swept sine wave of constant amplitude is supplied to the input of the equalizer and the amplitude of the signal at its output is measured (for example, by a synchronous detector), the output amplitude does not provide a correct representation because the equalizer does not have a normal signal passing through it and is not, therefore, being tested under normal operating conditions. If the equalizer includes automatic level control or line build out then an appropriate feedback voltage must be supplied. Most regenerators do not include provision for supplying this feedback voltge.

PRIOR ART

In the prior art, a report (No. 6930) of the Austrilian Post Office Research laboratories entitled "A Prototype Primary Level PCM Regenerator Threshold Level Tester" by G. J. Semple and L. J. Millot and dated November 1974 discloses the prototype of a test unit for measuring decision threshold levels of a primary level PCM regenerator. The unit is also stated to be useful for making measurement of intersymbol interference (ISI) produced by equalized pulses at the decision point in the regenerator being tested. For reasons discussed below, the apparatus referred to in the above report could not be used for making measurements of relative frequency response, by which is meant the difference between attenuation or gain of the element in a digital transmission path, for example a regenerator equalizer, from one frequency to another.

To make a complete test of a regenerator, for example, it is necessary to measure the equalizer's relative frequency response under its normal operating condition, which is to say without freezing the automatic gain control voltage and without opening up the regenerator.

INVENTION

The present invention provides a method of measuring relative frequency response of an element in a transmission path of a digital transmission system, the method comprising the steps of (a) providing a sequence of pulses along that path at the input of said element, at least one pulse in said sequence having a lower noise margin that the other pulses in said sequences; (b) adding to said sequence a sinusoidal signal whose frequency $f_s$ is such that at the successive said at least one pulses of lower noise margin, the phases of the said sinusoidal signal over a suitable predetermined time interval effectively cover all possible phases; (c) varying the amplitude of said sinusoidal signal to a level at which said at least one pulse with said sinusoidal signal added thereto can, as required, be detected as being of a state other than its normal state without the addition of said sinusoidal signal; (d) changing the frequency of said sinusoidal signal as many times as required, and, for each change, repeating steps (a), (b) and (c) with each changed signal; and (e) accumulating each amplitude with its corresponding frequencies obtained from performing steps (a), (b), (c) and (c) to produce a measure of said frequency response.

The term "noise margin" where used herein in relation to a pulse (also defined) means the variations of at least one parameter (e.g. amplitude) of that pulse from a normal value of that at least one parameter so that said pulse is detected by a detector of the transmission system as being in a state which is different from its normal state.

The term "pulse" is used herein to include an interval during which the transmission system has impressed upon it one signal of a predetermined set of signals, each signal of the set being distinguished by variations of at least one parameter thereof, for example voltage level, duration or timing or variations in phase, frequency or amplitude of a carrier, or combinations thereof during said interval. The frequency $f_s$ may be represented by the expression $$f_s = (K + 1/M) \cdot f_c / N$$

where
- $K = 0, 1, 2, 3 \ldots$,
- M is a positive number greater than a given value and determined by the allowable maximum error,
- N = no. of pulses in said at least one sequence, and
- $f_c$ = baud rate of the sequence of pulses.

Where M is a positive integer, the maximum error of measurement is given by the expression $20 \log_{10} \cos(\pi/M)$ dB;

M is preferably any number equal to or greater than 21, for an error of 0.1 dB or better.

Said at least one pulse has an amplitude which, when said at least one pulse is introduced into said sequence, can be varied to an extent such that it is detectable as a pulse of a state different from its normal state and the amplitude of the pulse adjusted by a predetermined amount therefrom so that it has a lower noise margin than the pulses of said sequence. The provision of a variable pulse allows the added sine wave to be smaller in amplitude that if all the pulses were of normal height. If, on the other hand, all of the pulses were of normal height the amplitude of the added sine wave would be so large that it would unduly affect the feedback loop of, for example, a regenerator equalizer.

The at least one pulse having said lower noise margin is maintained in the same position relative to each sequence. In a series of sequences of pulses, all sequences do not necessarily have therein a pulse having said lower noise margin. The mode of operating may be adopted if it is essential to complete measurements within a short period of time. The sequence of pulses is chosen to be representative of normal traffic along said transmission path. Using such a sequence of pulses, measurements can be made under conditions closely approximating those under which the element, for example a regenerator, would be used.

The present invention also provides apparatus for measuring the relative frequency response of an element in a digital transmission path of a digital transmission system including a transmitter and a receiver, the apparatus comprising (a) means for providing a plurality of sequences along the transmission path; (b) means for providing at least one pulse in at least one sequence of said plurality of sequences, said at least one pulse having a noise margin which is lower than the noise margin of the other pulses in said at least one sequence; (c) means for adding to said at least one sequence, at a location along the transmission path, a sinusoidal signal whose frequency $f_s$ is such that at the successive said at least one pulse of lower noise margin, the phases of said sinusoidal signal over a suitable predetermined time interval effectively cover all phases; (d) means for varying the amplitude of said sinusoidal signal to a level at which said at least one pulse with said sinusoidal signal added thereto can be detected, as required, as being of a state other than its normal state without the addition of said sinusoidal signal; (e) means for changing the frequency of said sinusoidal signal as many times as required; (f) means for allowing the two providing means, the varying means and the changing means to be re-cycled to operate for each change of said frequency of said sinusoidal signal; and (g) means for accumulating each amplitude with its corresponding frequencies to provide a measure of said frequency response.

We believe that a method and apparatus according to the present invention provide two important advantages which are not provided in the prior art. Firstly, measurement of frequency response can be effected while the transmission path in which the element is included is carrying its normal signal and while the control loop of the element (i.e. a regenerator) is operating. Secondly, it is not necessary to gain access to points inside a regenerator, but only to its normal input and output connections.

BRIEF DESCRIPTION OF DRAWINGS

There now follows a detailed description which is to be read with reference to the accompanying drawings of a method and apparatus according to the invention; it is to be clearly understood that this method and apparatus have been selected for description to illustrate the invention by way of example and not by way of limitation.

In the accompanying drawings:

FIG. 4(a) is a diagram showing a portion of a test pattern including a variable pulse;

FIG. 4(b) is a diagram showing the test pattern portion of FIG. 4(a) but with the waveform as it would appear at the decision point of a regenerator;

FIG. 4(c) is a diagram showing a low level sine wave to be added to the wave shown in FIG. 4(b);

FIG. 4(d) is a diagram showing the combined waveform of FIGS. 4(b) and 4(c);

FIG. 4(e) is a diagram showing the waveform of FIG. 4(d), where the amplitude is increased to a value such that an error is detected at the test pulse position;

FIGS. 4(f) to 4(h) correspond to FIGS. 4(d) to 4(e) for $f_s > f_c$;

DESCRIPTION OF PREFERRED EMBODIMENT

A PCM line regenerator as used in the British Post Office's 2.048 Mb/s digital line system receives a line signal normally which comprises pulses or bits each of which can be in one of three possible states '+1', '−1' and '0' with +V, −V and 0 volt half width return to zero pulses. V is normally 3 volts and the line a 120 ohm twisted pair. To measure the frequency response of a PCM line regenerator, we use a signal pattern, provided by a pseudo random binary sequence (PRBS) generator which is representative of normal traffic through the regenerator. We have found that a pattern of 1024 or 1023 pulses can represent normal traffic.

Figure 8:
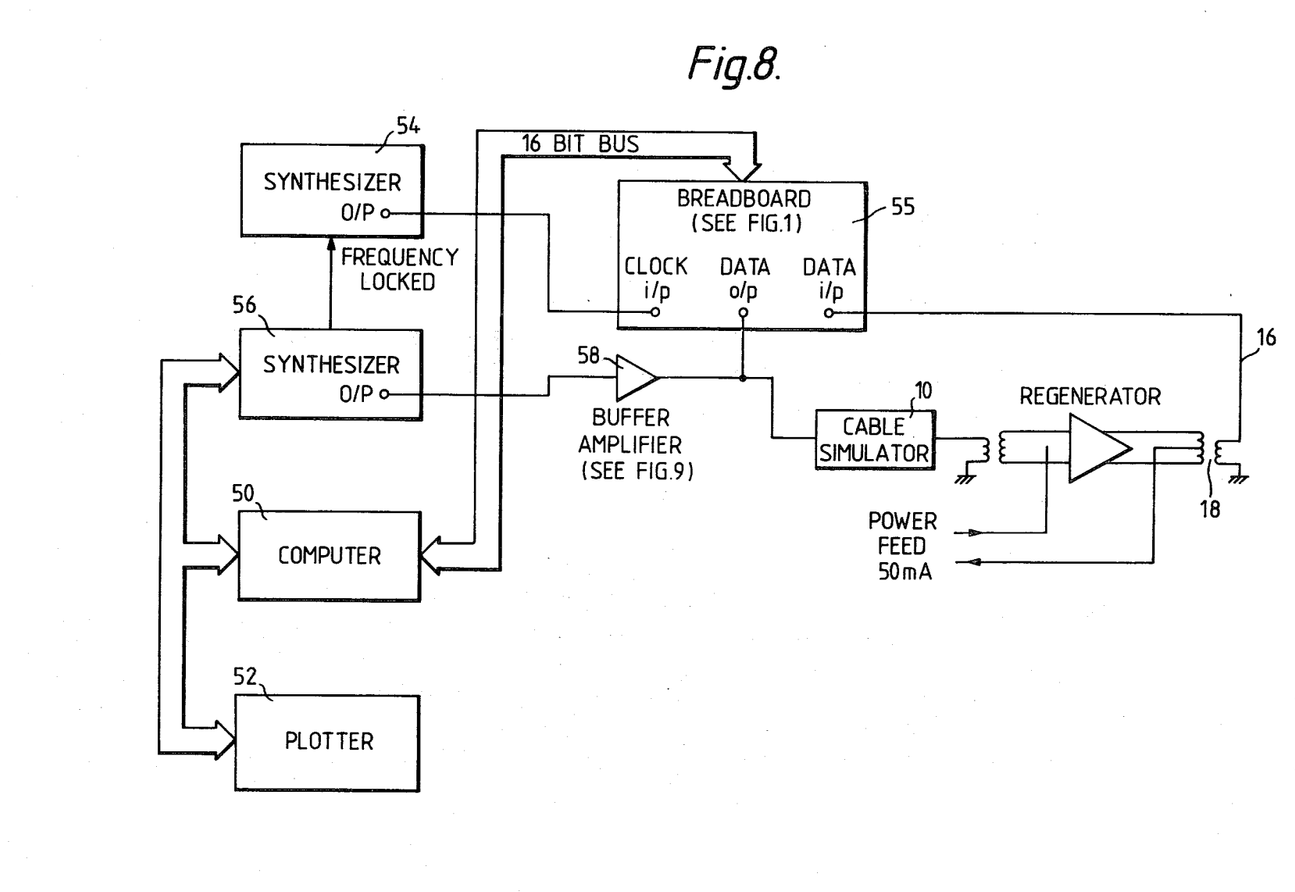
FIG. 8 is a block circuit diagram equivalent to that of FIG. 1 illustrating a practical format of that circuit.

The illustrative apparatus according to the present invention is shown in FIG. 8 and as can be seen therein is arranged to measure the frequency response of a regenerator under test. The regenerator is connected to receive an input from a cable simulator 10 on a line 12 via an input transformer 14 to which power is supplied by a power feed 15, and to provide an output on a line 16 via a transformer 18.

Means of the apparatus according to the present invention for providing a plurality of sequences of pulses is provided by a pseudo random binary sequence (PRBS) generator 20 (which may be provided by a Hewlett-Packard Model 3762A data generator), a sequence generator 21 of which provides sequences of pulses (for example $2^{10}$ pulses) which are representative of normal traffic through a transmission cable. The output from the PRBS generator 20 is fed to a high density bipolar (HDB) coder 22 which converts the input thereto to HDB3 code (wherein the maximum number of consecutive zeroes is three). The coder 22 has positive and negative outputs to a combined output amplifier and pulse deleter 24, 37.

The output amplifier 24 provides a first amplifier of the apparatus according to the present invention, which provides a sequence of coded pulses as its output in response to an input from the HDB3 coder 22.

The apparatus according to the present invention further comprises a variable pulse generator 26 which itself comprises a second amplifier having an output 28 which is connected to the output 30 of the combined output amplifier 24 and pulse deleter 37. The pulse deleter 37 provides means for inhibiting generation of a pulse (or pulses) in the sequence of pulses at a predetermined position as hereinafter described for substitution by a pulse (or pulses) from the variable pulse generator 26.

The generator 26 itself comprises a digital-to-analog converter controlled by a computer 50 for varying at least one parameter of the variable pulse (i.e. the voltage) so that the initial value of the parameter is set at a level which is selected to correspond to a predicted threshold value of two adjacent states.

The variable pulse generator 26 and the pulse deleter 37 are both initiated by a trigger circuit 34 in response to generation by a subsequence generator 23 of the PRBS generator 20 of a predetermined subsequence of the sequence of pulses to establish identity in a comparator 25 between the subsequence and subsequence portion of the sequence of pulses.

The inhibition of the generation of a pulse in the sequence of pulses is achieved in response to identity between the subsequence and the subsequence portion of the sequence, and in the sequence which is provided on the combined output line 31, the deleted pulse is replaced by the variable pulse from the generator 26. According to the parameter of the pulse which is to be monitored, the voltage level, for example, or the timing, duration, phase, frequency or amplitude, can be varied.

Means of the apparatus according to the present invention for adding a sinusoidal signal of frequency $f_s$, for varying the amplitude thereof and for changing its frequency are provided by a sine wave source including a programmable attenuator/amplifier 47 and a programmable oscillator 49 controlled by the computer 50. The attenuator/amplifier has an output connected to the output 28 from the variable pulse generator 26.

As desired, the sequence of pulses containing the variable pulse can then be fed to the cable simulator 10 (or can bypass the cable simulator as indicated by the dotted line 33 in the event that the cable simulator is not required as for example when a memory or storage device is under test or the transmission medium is free space). With the sequence fed through the simulator 10, the output sequence therefrom is attenuated and has inter-symbol interference (ISI) added thereto in the same manner as would a transmission cable itself. This sequence of pulses is then passed through a regenerator under test via a first transformer 14, and then via a second transformer 18 and a line 16 to a combined data input amplifier and clock recovery circuit 36, where a clock signal is recovered and the signal provided by the pulse sequence is amplified and passed on positive and negative outputs to an HDB3 decoder 38. If, of course, the regenerator is one which is the last in a line, it will not have an output transformer but a single line output instead.

Power is supplied to the regenerator under test from a power feed connected to centre taps of the secondary winding and primary winding of the first and second transformers 14 and 18 respectively.

The output of the HDB3 decoder 38 should, in the absence of errors, be indentical to the pattern produced by the PRBS generator 20. The reference pattern generator 40 controlled by the computer 50 can be commanded to synchronize itself to the output from the decoder 38. Its output is then designed to be a fixed number of clock periods in advance of the pattern on the line 46 such that after the coder 42 the two patterns are in synchronism and errors are detected by comparing the output from the coder 42 with that on the line 46. A trigger detector 48 connected to the pattern generator 40 produces a trigger at substantially the same position within the reference sequence as the variable pulse position within the pattern on the output 31. Its timing is such as to classify errors detected in the error detector 44 according to their position within the sequence, that is whether they occur at the position of the variable pulse or elsewhere. Errors occurring elsewhere are taken as a sign of loss of synchronization.

To compare two HBD3 encoded signals requires two lines for each signal, one for positive pulses one for negative, and therefore requires two error detectors or comparators. This can be simplified without loss of accuracy by 'OR'ing the two lines for each signal together into one. Only one comparator is then needed. This is why only one line 46 is shown from the amplifier 36 to the detector 44 and why the coder 42 has a single output.

The amplifier/clock recovery 36, the decoder 38 and the reference pattern generator 40 could be provided by a modified Hewlett-Packard 3763A error detector. Because this incorporates its own synchronization logic, the trigger detector 48 is not required. Access to internal circuit nodes is needed to obtain line 46 and the output equivalent to that from the generator 40. These with appropriate timing delays could then be connected to the coder 42 and the detector 44.

The computer 50 and plotter 52 provide means for determining which state of a number of possible output states of the variable pulse is indicated by the value of the output of the detector 44, the plotter 52 providing a visual record of the accumulated values. The value of the variable parameter of the variable pulse can also be monitored, and differences between the output from the regenerator and the reference sequence, according to position in time, can be compared to the output from the trigger detector 48.

Figure 4:
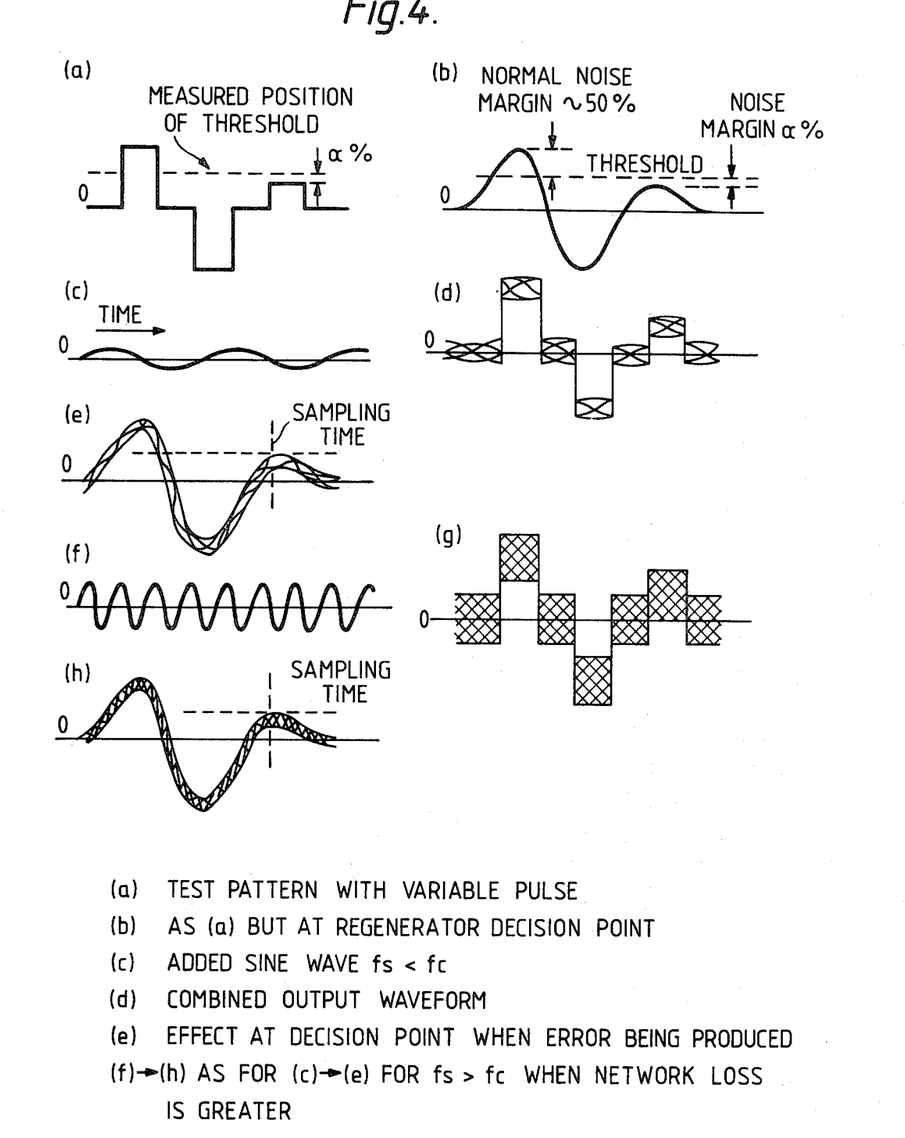

For the test the variable pulse is kept in a fixed position within the transmitted test pattern. It is varied in amplitude until the threshold for that position is found. The test pulse amplitude is then changed by some percentage—say 10%. FIG. 4(a). This means that the variable pulse will have a much reduced noise margin compared with the rest of the sequence. FIG. 4(b). A low level sinusoidal signal (FIG. 4(c)) is then added to the pulse train. FIG. 4(d). The amplitude of this is increased until an error is detected at the test pulse position. FIG. 4(e). The peak amplitude of the sine wave can now be assumed to be 10% of the pulse height at the decision point. By repeating this for a succession of different frequencies from say 10 kHz to 10 MHz a graph of the combined cable simulator plus equalizer response can be plotted. Since the required signal at the decision point to cause an error is constant, the input level needed is inversely proportional to the path loss. The absolute gain or loss cannot be measured without probing the circuit. What can be plotted is relative gain or loss.

At certain frequencies of the added sine wave, its phase at the test pulse position will be constant though unknown. It is unknown because the relative time delay between the pulse train and the sinusoid through the item under test is unknown. The frequencies used should be chosen so that the sinusoid runs through all possible phase relationships with the test pulse at the decision point.

Figure 5:
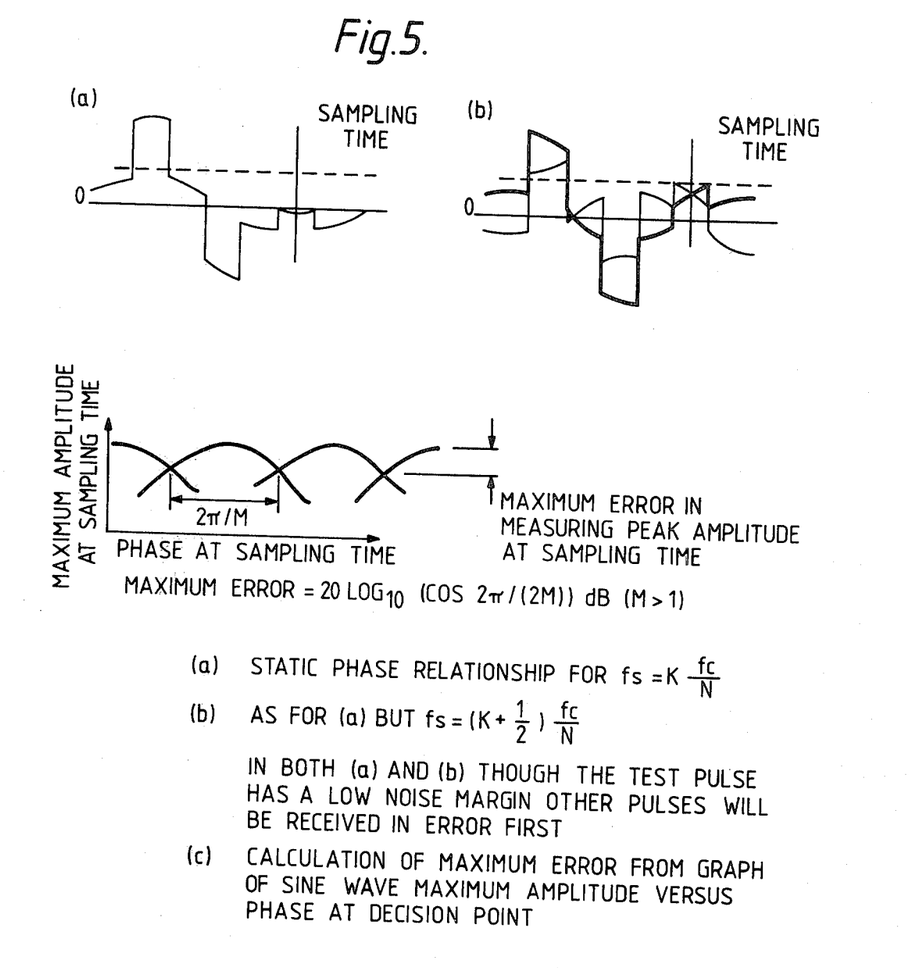
FIG. 5(a) is a diagram illustrating the static phase relationship for $f_c = K(f_c/N)$
FIG. 5(b) is a diagram illustrating the static phase relationship for $f_c = (K + \frac{1}{2})(f_c/N)$
FIG. 5(c) is a graph of the sine wave maximum amplitude against phase at the decision point for calculating maximum error.

We are interested in the phase at consecutive test pulses. If the test pulses are N clock periods apart then the phase of the sinusoid at frequency $f_s$ will always be the same at the test pulse (FIG. 5(a)) if a whole number of cycles of $f_s$ occur in N periods of the clock frequency $f_c$, i.e.:

$$f_s = K \cdot (f_c/N)$$

where $K = 1, 2, 3 \ldots$

Note that $f_c/N$ is the pattern and test pulse repetition rate.

Other frequencies to avoid are those where there is low number of possible phases that the sinusoid can take at the test pusle position. For example if $f_s = (K + \frac{1}{2})(f_c/N)$ then there will be two possible phases (FIG. 5(b)). The frequencies to avoid are therefore:

$$f_s = (K + 1/M) \cdot (f_c/N)$$

where M is a positive number less than a given value.

Since the method requires that the peak of the added sinusoid coincides with the sampling instant at the decision point, any static phase relationship of the type just described stands a good chance of producing bad results. As M increases the maximum error due to this becomes progressively smaller. For example when M is 21 the maximum error is 0.1 dB (Fig. 5(C)). In this case after every amplitude step the instrument must check 21 consecutive test pulses at the regenerator's output for an error. Only then can it decide whether or not to increase the amplitude or step on to the next frequency. As M increases the number of consecutive test pulses to be checked increases as does the measurement time. M should, therefore, be kept as low as possible consistent with the accuracy desired. Thus for 0.1 dB M is a minimum of 21 while for 0.01 dB the minimum M is 66. From the accuracy desired a minimum M can be chosen. For minimum measurement time the ideal frequencies are then of the form:

$$f_s = (K + 1/M) \cdot f_c/N$$

Figure 6:
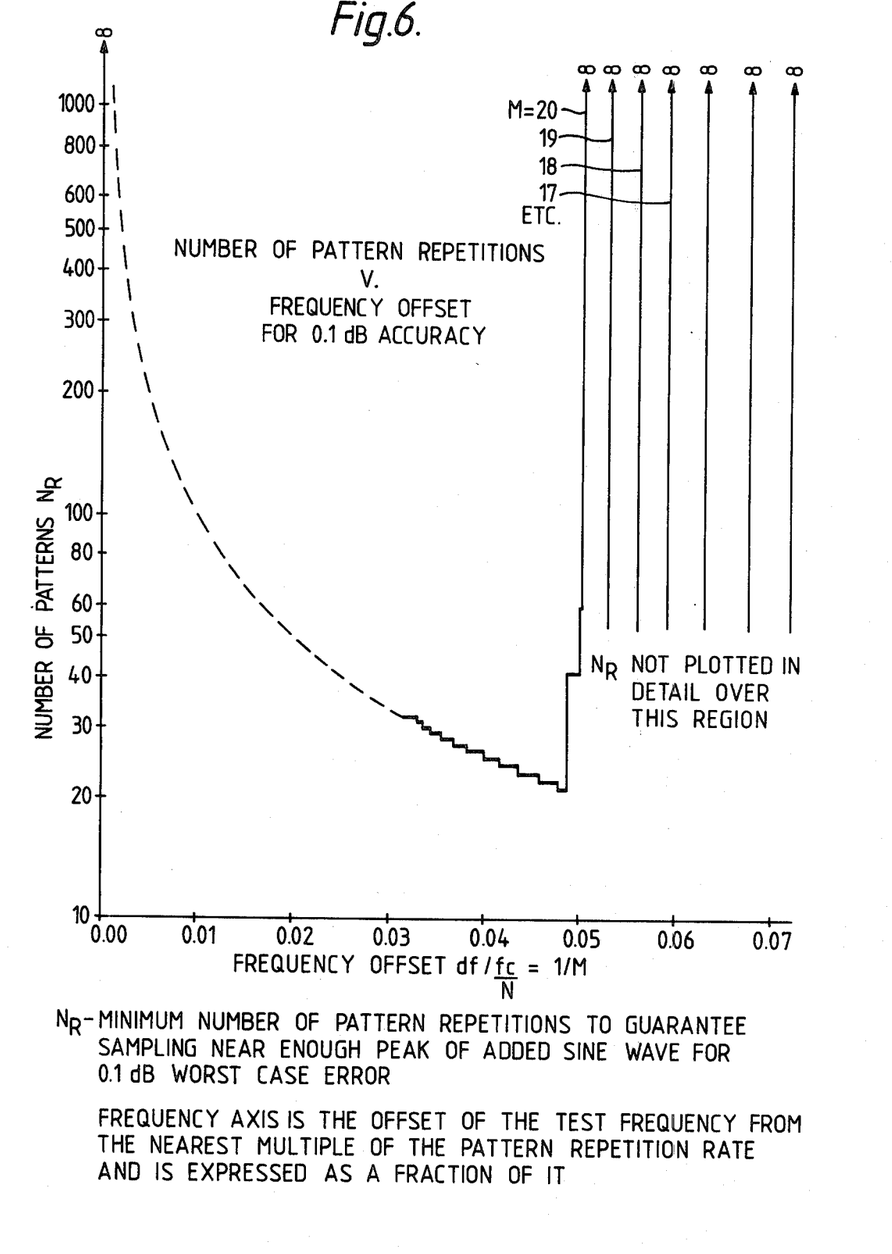
FIG. 6 is a graph of the number of test pulses or sequence repetitions against frequency offset to attain 0.1 dB accuracy.
Figure 7:
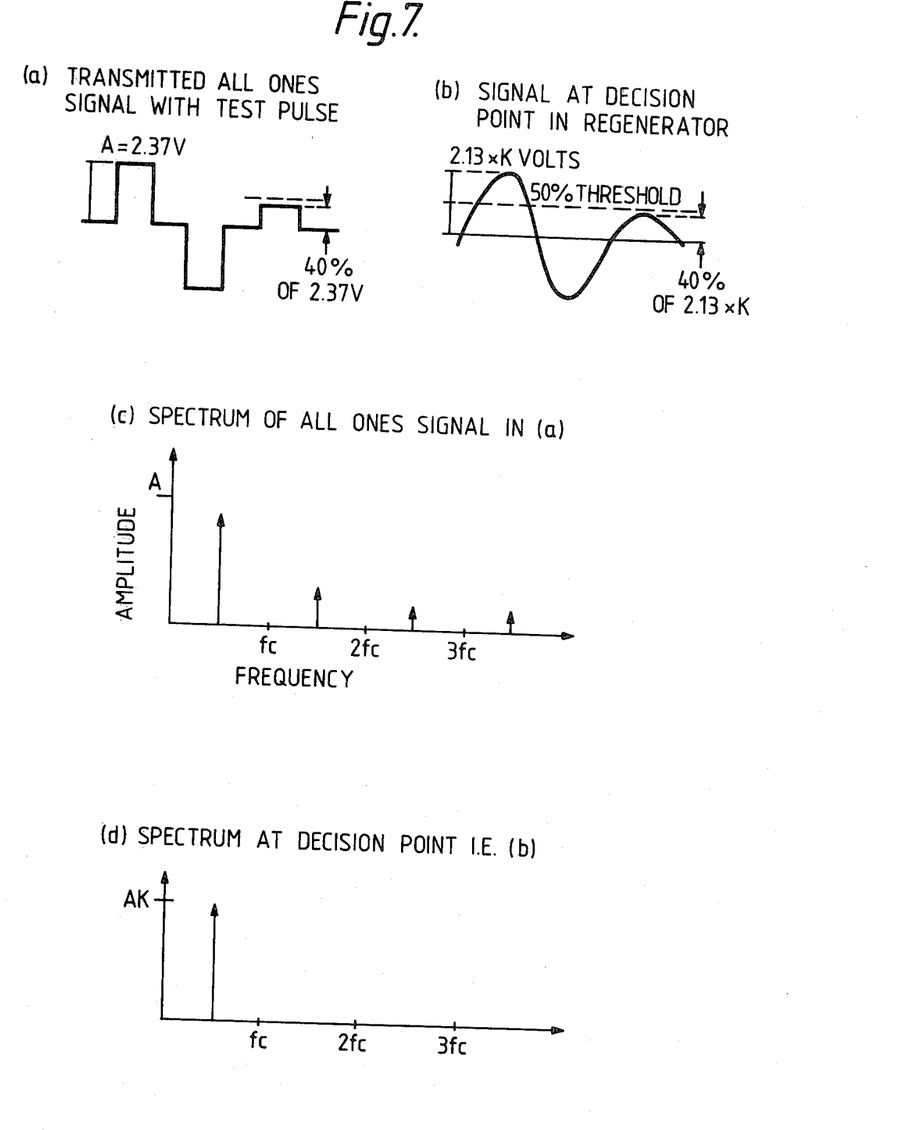
FIG. 7(a) is a diagram of a transmitted all '1's signal incorporating a variable pulse.
FIG. 7(b) is a diagram of the corresponding sinusoidal signal at the decision point of the regenerator.
FIG. 7(c) is a graph showing the spectrum of the signal shown in FIG. 7(a)
FIG. 7(d) is a graph showing the spectrum of the signal shown in FIG. 7(b)

To obtain these frequencies requires synthesizer accuracy. A lower accuracy source can be used at the expense of longer measurement times. A plot of the number of test pulse or pattern repetitions (Nr) required is given in FIG. 6 for an accuracy of 0.1 dB. The horizontal axis is scaled in terms of 1/M, the frequency offset from any multiple of $f_c/N$, the pattern repetition rate. The graph thus repeats every $f_c/N$ Hz and is symmetric about the vertical axis through 1/M=0. For M=20, 19, 18 . . . Nr is infinite. This is because the maximum error is greater than 0.1 dB. There is a broad region below an offset of 0.05 where the test tone can be placed. Selecting a value of 1/M around 0.025 to 0.04 reduces the required relative frequency accuracy of the sine and clock sources without significantly increasing the measurement time.

The required level of the added sinusoid will now be calculated for the case we are interested in, a 2Mb/s line regenerator.

Consider the all '1's pattern being transmitted. The spectrum of this contains components at odd multiples of half the clock rate, i.e. at 1, 3, 5 . . . MHz (FIG. 5(a), (c)). The combined cable plus equalizer characteristic is flat from a few kHz upwards until it rolls off rapidly in the vicinity of 1 MHz. The waveform at the decision point will, therefore, be almost a pure sine wave at 1 MHz all higher frequency components being very much attenuated. The transmitted marks in the line signal have an amplitude of + or −2.37 V. Spectral analysis gives the peak amplitude of the 1MHz component as 2.13 V. If A is the absolute gain through to the decision point at 1 MHz then the peak amplitude there will be 2.13×A volts and the thresholds should be at + and −1.065×A volts. If the variable test pulse is now transmitted the threshold should be measured at 50% of peak amplitude or 1.185 V. Reducing the test pulse by 10. of peak amplitude to 0.948 V will reduce its amplitude at the decision point proportionally to 40% of the peak or 0.852×A volts. The noise margin is, therefore, 10% of the peak or 213×A mV. The equivalent noise margin at the cable input is thus 213 mV. A sinusoid of 213 mV peak amplitude is, therefore, needed at $f_c/2$ to cause an error. This is −5.2 dBm.

At all other frequencies the relative gain (or loss) of the cable plus equalizer will affect the power required. Changing the step back in pulse amplitude from 10% to another value will also change the power needed. There will be small effect when a pattern other than the all '1's is used. The magnitude of this will depend on the peak detector in the regenerator and the ISI at the decision point.

The result of a measurement on a 2Mb/s regenerator is shown in FIG. 8. This was measured with 10% test pulse reduction and with a 14.3 dB amplifier in the synthesizer output. For this particular regenerator 1 dB should be added for pattern dependent effects. This was estimated by looking at the waveform at the decision point and comparing the peak-to-peak amplitude for a PRBS with that for the all '1's word. The level at 1 MHz should, therefore, be:

Level out of synthesizer $= -5.2 - 14.3 + 1 = -18.5$ dBm

The measured sensitivity (FIG. 8) is $-16.5$ dBm.

Figure 1:
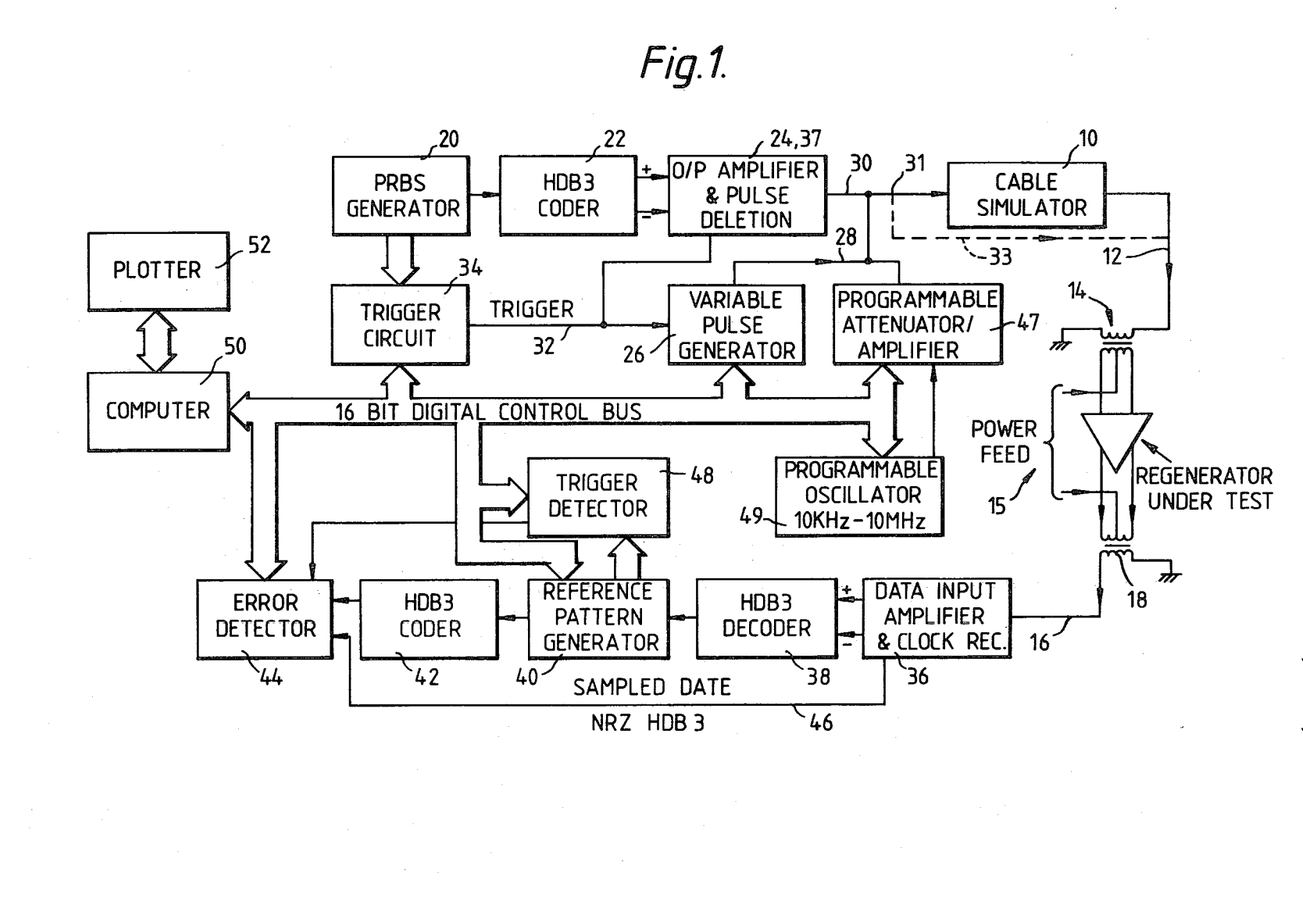
FIG. 1 is a block circuit diagram of an apparatus according to the present invention for measuring the relative frequency response of a regenerator under test.
Figure 2:
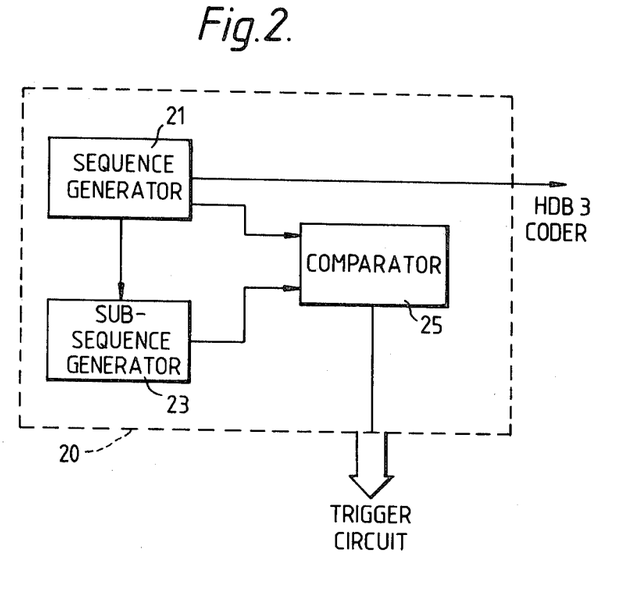
FIG. 2 is a block circuit diagram of the pseudo random binary sequence geenerator of FIG. 1.
Figure 3:
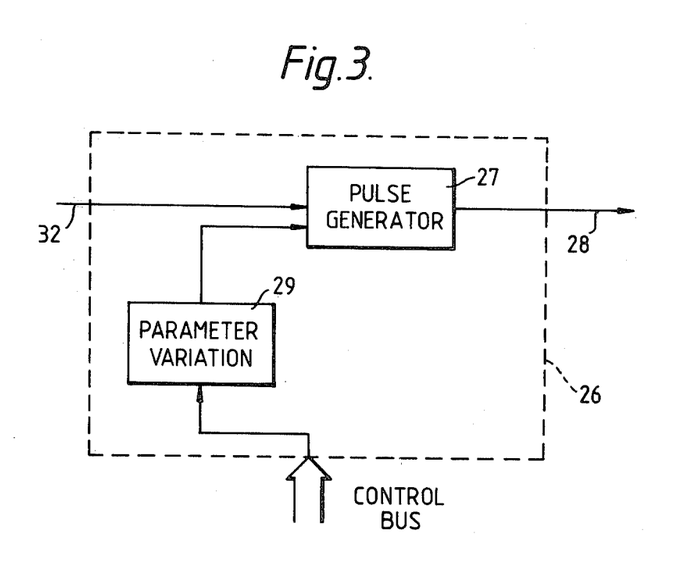
FIG. 3 is a block circuit diagram of the variable pulse generator of FIG. 1.

In FIG. 8, there is shown a practical realization of the circuit shown in FIG. 1. Components of FIGS. 1 and 8 which are the same are indicated by the same reference numerals. The breadboard 55 of FIG. 8 includes all the components of FIG. 1 enclosed by a dotted line.

Figure 9:
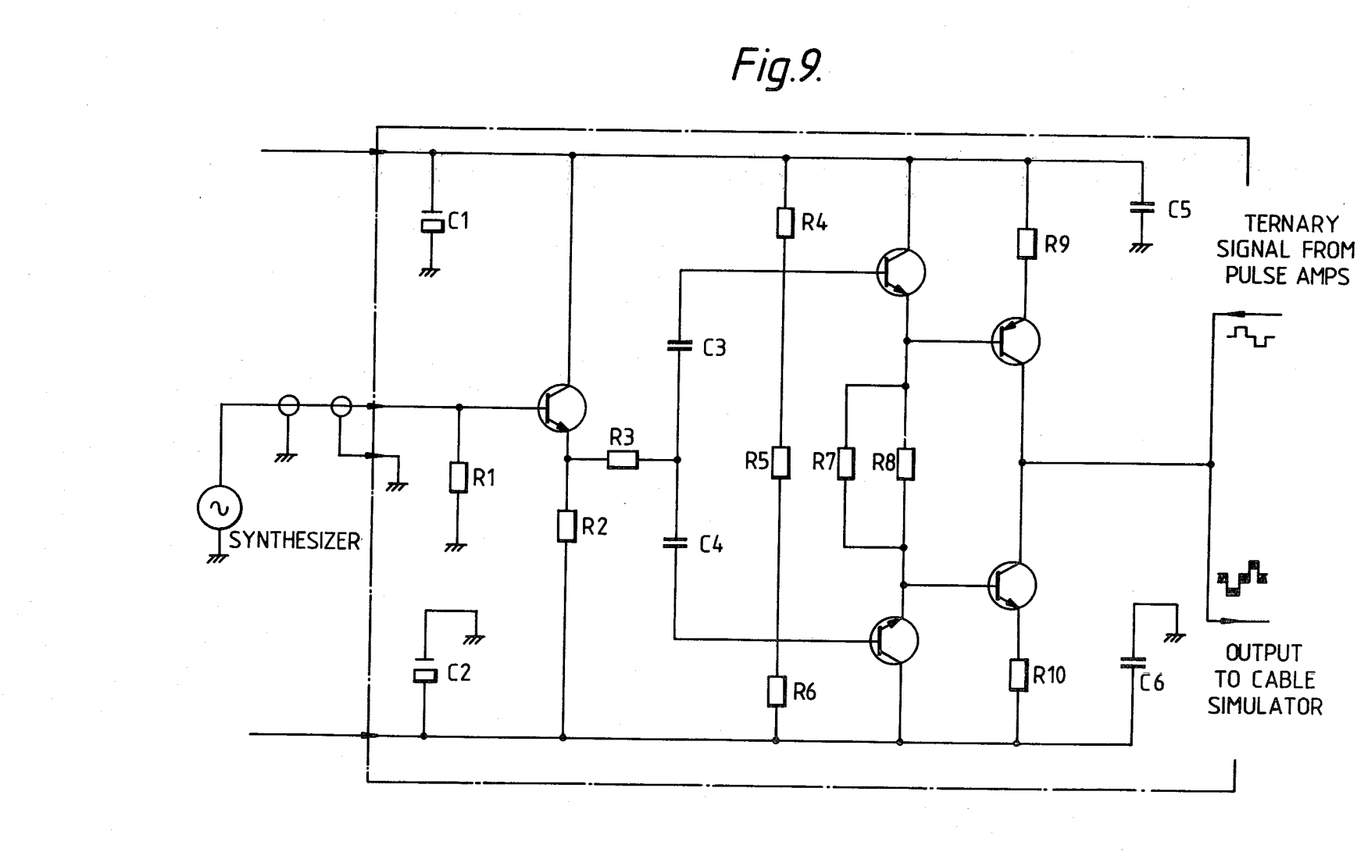
FIG. 9 is a circuit diagram of a buffer amplifier of the circuit shown in FIG. 8.

Our present experimental system (FIG. 8) uses one synthesizer 54 provided by a Hewlett-Packard Model 3320B Frequency Synthesizer set to the regenerator clock rate to drive the breadboard 55 of FIG. 1, and a second synthesizer 56, provided by a Hewlett-Packard Model 3335A Frequency Synthesizer, to give the variable frequency variable amplitude sinusoid. These two synthesizers have their frequency standards locked together by a back panel connection. A buffer amplifier 58 (FIG. 9) is used in the output of the synthesizer 56 to isolate it from the ternary signal and to give some 14.3 dB of gain. The computer 50 controls the synthesizer 56 and the breadboard 55. For the first frequency the synthesizer 56 starts off at minimum amplitude ($-88.4$ dBm) with all attenuator pads in circuit and its 2 dB electronic attenuator at maximum. Each pad in turn is removed starting with the largest. If an error is detected it is replaced and the next pad is tried. Once all the pads have been tried the electronic attenuator is stepped down in first 0.1 then 0.01 dB steps until the point at which the test pulse is received in error is measured to the nearest 0.01 dB. This value is taken as the starting point for the next measurement.

This is a much simplified account of the computer program used. There are wait times to allow the added sine wave to run through all phases at the test pulse position. The program also checks for loss of synchronization in the error detector and initiates resynchronization when required. At present 30 frequencies logarithmically spaced between 10 kHz and 10 MHz are used. Each is rounded down to the closest multiple of $f_c/N$ i.e. 2050/1023 kHz and then incremented by 50 Hz. This corresponds to a frequency offset of 0.025 in FIG. 6.

Figure 10:
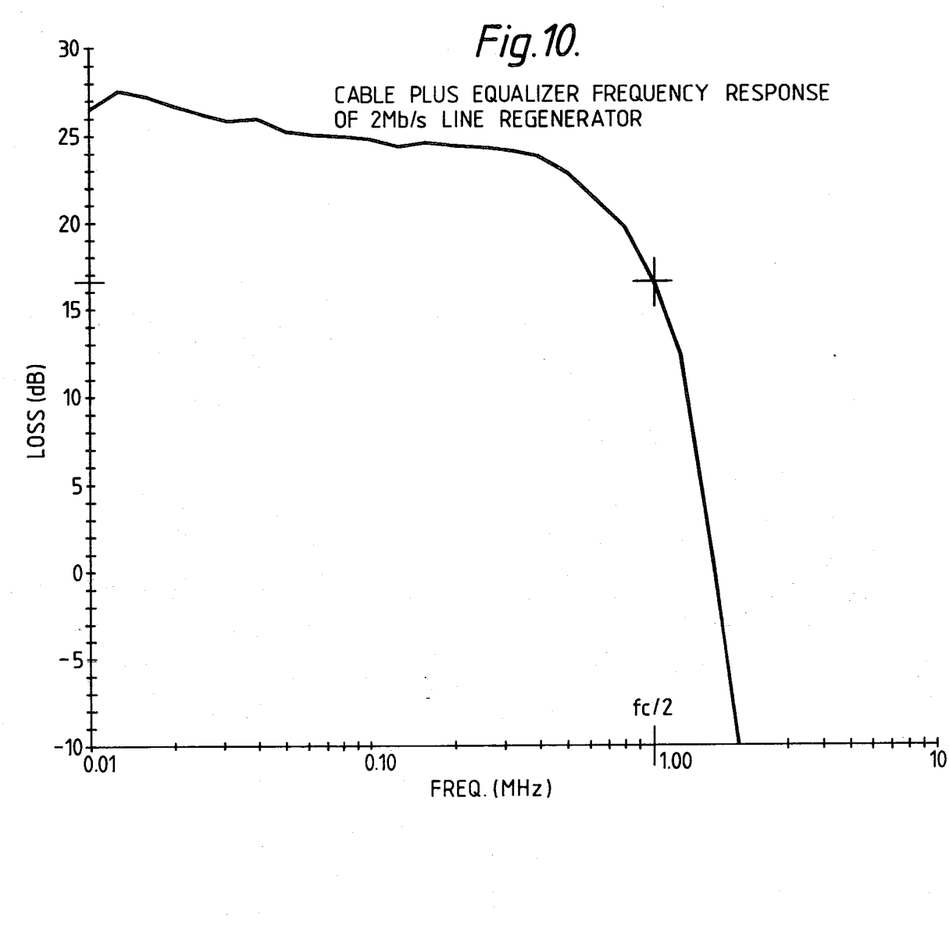
FIG. 10 is a graph showing a typical result, achieved in carrying out a method according to the present invention, of the frequency response of the equalizer of a PCM regenerator plus a 37 dB cable simulator.

A typical result from a PCM regenerator plus a 37 dB cable stimulator is given in FIG. 10. The vertical axis gives relative attenuation only and should not be interpreted in absolute terms.

In carrying out the above method the sinusoidal signal was added at the cable simulator input. It could equally well be added at its output. This would measure the characteristic of the equalizer alone.

What is claimed is:

1. A method of measuring relative frequency response of an element in a transmission path of a digital transmission system, the method comprising the steps of:
   (a) providing a sequence of pulses along that path at the input of said element, at least one pulse in said sequence having a lower noise margin than the other pulses in said sequences;
   (b) adding to said sequence a sinusoidal signal whose frequency $f_s$ is such that at the successive said at least one pulse of lower noise margin, the phases of the said sinusoidal signal over a predetermined time interval effectively cover all possible phases;
   (c) varying the amplitude of said sinusoidal signal to a level at which said at least one pulse with said sinusoidal signal added thereto can, as required, be detected as being of a state other than its normal state without the addition of said sinusoidal signal;
   (d) changing the frequency of said sinusoidal signal as many times as required, and, for each change, repeating steps (a), (b) and (c) with each changed signal; and
   (e) accumulating each amplitude with its corresponding frequency obtained from performing steps (a), (b), (c) and (d) to provide a measure of said frequency response.

2. A method according to claim 1 wherein said frequency $f_s$ is represented by the expression $$f_s = (K + 1/M) \cdot f_c / N$$

where
   $K = 0, 1, 2, 3 \ldots,$
   M is a positive number greater than a given value and determined by the allowable maximum error,
   N = no. of pulses in said at least one sequence,
   $f_c$ = baud rate of the sequence of pulses.

3. A method according to claim 2 wherein M is a positive integer and the maximum error of measurement is given by the expression $20 \log_{10} \cos (\pi/M)$ dB.

4. A method according to claim 2 or claim 3 wherein M is any number equal to or greater than 21, for an error of 0.1 dB or better.

5. A method according to claim 1, 2 or 3 wherein said at least one pulse has an amplitude which, when said at least one pulse is introduced into said sequence, can be varied to an extent such that it is detectable as a pulse of a state different from its normal state and the amplitude of the pulse adjusted by a predetermined amount therefrom so that it has a lower noise margin than the pulses of said sequence.

6. A method according to claim 1, 2 or 3 wherein said at least one pulse having said lower noise margin is maintained in the same position relative to each sequence.

7. A method according to claim 1, 2 or 3 wherein said sequence of pulses is chosen to be representative of normal traffic along said transmission path.

8. A method according to claim 1, 2 or 3 wherein said frequency $f_s$ is given by the expression $$f_s = L(1 + 1/M) \cdot f_c / N$$

where
   $L = 1, 2, 3 \ldots,$ and
   M is an integer greater than 20.

9. A method according to claim 1, 2, or 3 wherein said sinusoidal signal is added to said sequence only in the region of said at least one pulse of lower noise margin.

10. A method according to claim 1, 2 or 3 wherein said element is an equalizer or filter of said system and a cable simulator is connected thereto, said sinusoidal signal being added to said sequence of pulses at the input to said cable simulator or at the input to said element.

11. Apparatus for measuring the relative frequency response of an element in a digital transmission path of a digital transmission system including a transmitter and a receiver, the apparatus comprising:
(a) means for providing a plurality of sequences of pulses along the transmission path;
(b) means for providing at least one pulse in at least one sequence of said plurality of sequences, said at least one pulse having a noise margin which is lower than the noise margin of the other pulses in said at least one sequence;
(c) means for adding to said at least one sequence, at a location along the transmission path, a sinusoidal signal whose frequence $f_s$ is such that at the successive said at least one pulses of lower noise margin, the phases of the said sinusoidal signal over a predetermined time interval effectively cover all phases;
(d) means for varying the amplitude of said sinusoidal signal to a level at which said at least one pulse with sinusoidal signal added thereto can be detected, as required, as being of a state other than its normal state without the addition of said sinusoidal signal;
(e) means for changing the frequency of said sinusoidal signal as many times as required;
(f) means for allowing the two providing means, the varying means and the changing means to be recycled to operate for each change of said frequency of said sinusoidal signal; and
(g) means for accumulating each amplitude with its corresponding frequencies to provide a measure of said frequency response.

12. Apparatus according to claim 11 wherein said frequency $f_s$ is represented by the expression $$f_s = (K + 1/M) \cdot f_c/N$$

where
$K = 1, 2, 3 \ldots,$
M is a positive number greater than a given value and determined by the allowable maximum error,
N = no. of pulses in said at least one sequence,
$f_c$ = baud rate of the sequence of pulses.

13. Apparatus according to claim 12 wherein M is a positive integer and the maximum error of measurement is given by the expression 20 $\log_{10} \cos (\pi/M)$ dB.

14. Apparatus according to claim 11, 12 or 13 wherein means is provided for varying the amplitude of said at least one pulse.

15. Apparatus according to claim 11, 12 or 13 wherein means is provided for maintaining each successive said at least one pulse in the same position within a sequence as the position of a preceding at least one pulse in its respective sequence.

16. Apparatus according to claim 11, 12 or 13 wherein means is provided for selecting the frequency with which pulses of lower noise margins are introduced into the sequences of said plurality of sequences of pulses.

17. Apparatus according to claim 11, 12 or 13 wherein said means for providing said plurality of sequences of pulses comprises means for ensuring that each sequence is at least substantially representative of normal traffic along said transmission path.

18. Apparatus according to claim 11, 12 or 13 wherein said means for providing said plurality of sequences of pulses comprises a first amplifier arranged to provide said plurality of sequences of pulses as its output in response to an input from a pseudo random sequence generator.

19. Apparatus according to claim 11, 12 or 13 wherein said means for providing said at least one pulse comprises a second amplifier whose output is connected to said output of said first amplifier.

20. Apparatus according to claim 11, 12 or 13 wherein said means for adding a sinusoidal signal to said at least one sequence comprises a frequency synthensizer having a frequency step size of $(1 + 1/M) f_c/N$.

21. Apparatus according to claim 11, 12 or 13 wherein said means for adding a sinusoidal signal to said at least one sequence is arranged to add said sinusoidal signal only in the region of said at least one pulse of lower noise margin, and means is provided for controlling the adding means to achieve this addition.

22. Apparatus according to claim 11, 12 or 13 wherein means is provided for generating a predetermined subsequence of each sequence of said plurality of sequences and said means for providing said at least one pulse is triggered by identity between said subsequence and a subsequence portion of said each sequence.

23. Apparatus according to claim 11, 12 or 13 wherein means is provided for inhibiting generation of a pulse in each said sequence at said predetermined position in response to said identity between said subsequence and the subsequence portion of said each sequence.

24. Apparatus according to claim 14 wherein said means for varying said amplitude of said at least one pulse for varying said amplitude of said at least one pulse comprises a digital-to-analog converter controlled by data processing means.

25. Apparatus according to claim 19 wherein said transmitter of said system comprises a sequence generator having an output, a trigger detector connected to said output, and said first and second amplifiers.

26. Apparatus according to claim 25 wherein means is provided for monitoring the amplitude of said at least one pulse of lower noise margin, said means comprising a sequence generator and a trigger detector at least substantially identical to the sequence generator and the trigger detector of said transmitter, for generating a reference sequence, trigger detection occurring at substantially the same position in the reference sequence as occurs in the transmitted sequence.

27. Apparatus according to claim 26 wherein means is provided for synchronizing the output of said sequence generator of said monitoring means with the output from said transmission system under test.

28. Apparatus according to claim 27 wherein means is provided for comparing said output from said transmission system under test with said reference sequence.

29. Apparatus according to claim 27 wherein means is provided for classifying differences between said output and said reference sequence according to position in time compared to the output from said trigger detector of said monitoring means.

30. Apparatus according to claim 28 wherein means is provided for classifying differences between said output and said reference sequence according to position in time compared to the output from said trigter detector of said monitoring means.

31. Apparatus according to claim 11, 12 or 13 wherein each sequence of said plurality of sequences is coded and means is provided for examining said sequence in said system to establish that the pulses within said sequence conform to the code.

* * * * *

UNITED STATES PATENT OFFICE
CERTIFICATE OF CORRECTION

Page 1 of 2

Patent No. 4,445,221     Dated April 24, 1984

Inventor(s)  Alastair S. Reynolds et al.

It is certified that error appears in the above-identified patent and that said Letters Patent are hereby corrected as shown below:

On the face of the patent, the following information should be included:
[30] Foreign Application Priority Data:
January 8, 1981  [G.B.] United Kingdom ...............8100493

| | | |
|---|---|---|
| Column 1 | line 41 | "that" should read --- the --- |
| | line 53 | "robe" should read --- probe --- |
| | line 57 | "This" should read --- Thus --- |
| | line 68 | "voltge" should read -- voltage -- |
| Column 2 | line 2 | "Austrilian" should read -- Australian -- |
| | line 33 | "that" should read -- than -- |
| | line 48 | "(c)" (second occurrence) should read -- (d) -- |
| Column 3 | line 20 | "that" should read -- than -- |
| Column 4 | line 21 | "geenerator" should read -- generator -- |
| | line 39 | "$f_c = K(f_c;/N)$" should read -- $f_c = K(f_c/N);$ -- |
| | line 41 | "$f_c=(K+\frac{1}{2})(f_o/N)$" should read |

$$-- f_c = K(f_c/N); --.$$

UNITED STATES PATENT OFFICE
CERTIFICATE OF CORRECTION

Patent No. 4,445,221                Dated April 24, 1984

Inventor(s) Alastair S. Reynolds et al.

It is certified that error appears in the above-identified patent and that said Letters Patent are hereby corrected as shown below:

Column 7  line 55    "pusle" should read -- pulse --
Column 12 line 9     "synthen-" should read -- synthe --

Signed and Sealed this

Ninth Day of October 1984

[SEAL]

*Attest:*

*Attesting Officer*

GERALD J. MOSSINGHOFF
*Commissioner of Patents and Trademarks*